Patented Nov. 7, 1933

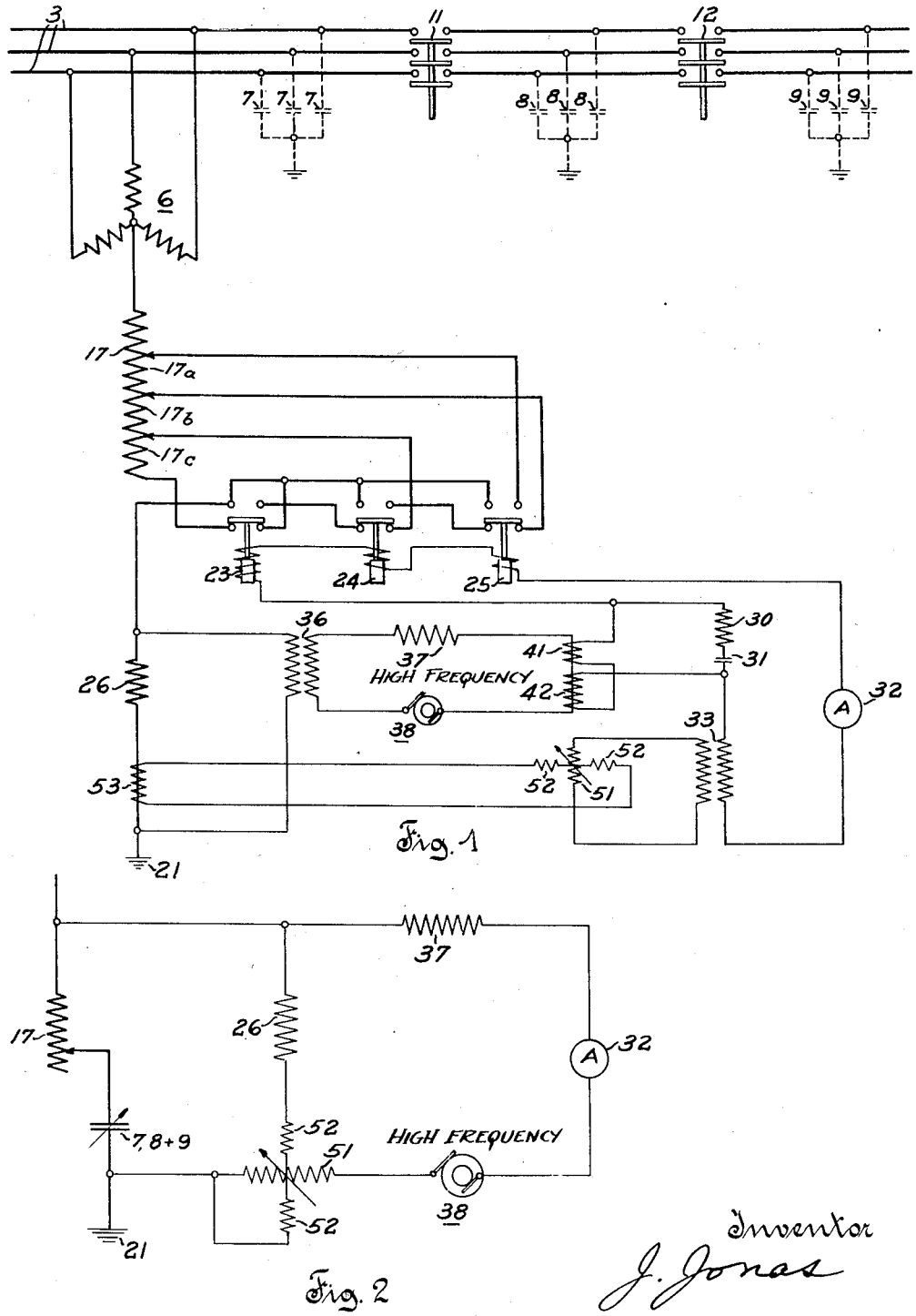

1,934,229

UNITED STATES PATENT OFFICE 1,934,229

ELECTRIC LINE PROTECTIVE SYSTEM

Julius Jonas, Baden, Switzerland, assignor to Aktiengesellschaft Brown Boveri & Cie., Baden, Switzerland, a joint-stock company of Switzerland Application October 29, 1931, Serial No. 571,813, and in Switzerland October 31, 1930

14 Claims. (Cl. 172—237)

This invention relates to improvements in protective systems for electric power transmission lines or networks, and more particularly to means for minimizing the effect of accidental grounds in transmission lines for high voltages.

In electric power transmission lines, it is often the practice to connect the neutral point of some apparatus connected with the line to ground either directly or, preferably, with interposition of a reactor or grounding coil of predetermined electrical characteristics. The pupose of such coil is to suppress the fault current which would tend to flow whenever one of the line conductors accidentally comes in contact with ground or with grounded structures. To obtain such effect, the coil should be so dimensioned as to be at least substantially in electrical resonance with the capacity of the line to ground for a frequency which may be the operating frequency, but is preferably a frequency differing slightly therefrom. Operating requirements, however, make it necessary to connect variable lengths of line sections or branches, so that the capacity of the line to ground becomes a variable quantity. To retain resonance between the line and the grounding reactance coil at all times, it is accordingly necessary to provide such reactance coil with adjusting means such as taps, to provide means for indicating the capacity of the line and also to provide means for automatically adjusting the grounding coil in response to changes in the capacity of the line and of any networks connected therewith. If the line is of uniform construction and is not too ramified, its capacity to ground is also a measure of its connected length which then does not need to be ascertained otherwise. In non-uniform or in largely ramified lines, the capacity may be used for assigning to the line, a fictitious length based on its electrical characteristics.

To determine the capacity of the line and the resonance condition of the grounding coil, it has been proposed to insert an auxiliary variable speed alternating current generator into the connection with the grounding coil to adjust the frequency of the auxiliary generator output voltage to such value as will cause the current delivered by the auxiliary generator to the grounding coil and the line capacity to be in phase with the auxiliary generator voltage, thus showing that the coil and the line are in resonance for that particular frequency. Such method requires that the generator speed be adjustable and requires computations to ascertain the desired result. To overcome the above disadvantage, it has been proposed to maintain the frequency of the auxiliary generator constant and to measure the phase angle of the current delivered by the generator to the grounding coil and the line capacity. The sensitivity of the above method is, however, satisfactory only over a very small part of the range and becomes less sensitive the greater the difference of the network length from the length corresponding to resonance. In addition to the lack of sensitivity, both of the above indicated methods present the disadvantage of introducing undesirable oscillations into the line during normal operation even with a comparatively low generator voltage. Such oscillations are effectively reduced by connecting the generator across a comparatively small part of the grounding coil which, however, introduces considerable errors in the characteristics of the grounding coil, unless the impedance of the generator circuit be made so high as to render the system insensitive beyond all usefulness. In any case, currents of the network frequency must be kept away from the instruments which are to operate at the frequency to be measured. Shunting such instruments by a circuit resonant to the line frequency is impossible because the grounded portion of the quenching coil is then short circuited thereby which will prevent meeting the practical requirements. All three of the indicated systems also present the disadvantage of having the generator and the necessary measuring instruments directly connected to the line circuit which requires immediate disconnection upon the occurrence of a ground or other disturbance in the line.

If two coils of very different inductances connected in series are used instead of the single grounding reactance coil and the auxiliary generator, if the measuring circuits are connected across the coil of lower inductance through an insulating transformer and if the measuring circuit is provided with current limiting means; all of the above set forth disadvantages are avoided. The current in the measuring circuit may then be used for the control of means for adjusting of the coil of higher inductance because the effect on the ground circuit is very slight, only a small portion of the total inductance being affected by the action in the measuring circuit. With the above arrangement, the inductance in the measuring circuit may be chosen without regard to the action of the line frequency currents in the grounding circuit. The inductance may then be in resonance with the auxiliary frequency therein. A high degree of sensitivity and a high degree of exactness in measurement are thus obtained. Moreover the auxiliary frequency will not cause any material oscillations because the quenching coil is not in resonance with the partial capacities of the line to ground which are in series with the measuring circuit:

It is, therefore, among the objects of the present invention to provide a system for determining the capacity to ground of a high voltage transmission line by means of currents of an arbitrarily fixed frequency.

Another object of the invention is to provide a system for determining the capacity to ground of a high voltage transmission line in which a measuring circuit is insulated from the line and is provided with current limiting means.

Another object of the invention is to provide a system for protecting high voltage networks by means of two grounding coils in series.

Another object of the invention is to provide a system for adjusting the inductance of one of several grounding coils connected with a high voltage transmission line in response to a current circuit measuring the capacity of the network to ground.

Another object of the invention is to provide a system for indicating any departure of the adjustment of a grounding coil for protection of a high voltage transmission line from the desired resonance condition.

Objects and advantages other than those above set forth will be apparent from the following description when read in connection with the accompanying drawing forming a portion of the present disclosure in which:

Figure 1 diagrammatically illustrates one embodiment of the present invention, and Figure 2 is a simplified diagram illustrating the method of measurement of the embodiment of Fig. 1.

Referring more specifically to the drawing by characters of reference, the reference numeral 3 designates an alternating current transmission line shown as a three phase line divided into a number of sections by means of circuit breakers 11 and 12 as frequently met in practice. Each section of the line presents a distributed capacity relative to ground represented by banks of condensers 7, 8 and 9. The line is grounded at the neutral point of a group of windings 6, which may be the windings of a generator or one set of the windings of a transformer. A grounding reactance coil 17, having taps dividing the same into a plurality of sections 17a, 17b and 17c, and a non-adjustable grounding reactance coil 26 are connected between the neutral point of windings 6 and ground as at 21. Both coils are of the usual construction with either air or iron cores, and constitute separate pieces of equipment. Coil 26 is bridged by a winding of a transformer 36 to another winding of which are connected an auxiliary alternating current generator 38, a measuring circuit and control circuits. The greater portion of the ground protection of the line 3 is provided by coil 17, while the inductance of coil 26 is such as to provide only for the proper operation of the measuring circuit to be described hereinafter. It will be understood that the combined inductances of coils 17 and 26 and of the measuring and control circuits must be equal to the inductance of the single grounding coil such as previously employed. Such inductance is obtained without difficulty, and as the greater part of the inductance is supplied by coil 17, the inductance of the measuring circuit need not be adjusted with great accuracy.

One of the measuring and control circuits includes a generator 38 which may be of any of the usual types, but which must generate current at a frequency differing from the line operating frequency, so that any measurements will not be affected by the residual ground currents always present in transmission systems. It will usually be convenient to choose an auxiliary frequency equal to a multiple of the operating frequency. The generator may then be a synchronous frequency changing set or a frequency multiplier and is connected through an inductance 37, the purpose of which will appear hereinafter, which inductance is connected in series with the generator and a winding of the transformer 36 in parallel with the coil 26. The current of generator 38 is measured by means of an ammeter 32 connected with the generator circuit through means which bypass the ground currents of operating frequency and limit the magnitude of the current in the bypass to a safe value upon occurrence of a ground on the line 3. Such means may, preferably, comprise two current transformers 41 and 42 having different current ratios and having the secondary windings thereof connected in opposition, and dimensioned so that both transformers become saturated for a value of current silghtly higher than the measuring current. The characteristic curves of the transformers then intersect at a point where the secondary voltages are equal and opposite in direction so that the resulting voltage is zero. In the beginning, the secondary current increases proportionally with the primary current and then reaches a maximum. If the full ground current flows through the primary windings of both transformers 41, 42, the secondary current is below the maximum which requires a relatively low primary curernt. The secondaries of transformers 41 and 42 are bridged by an inductance 30 and a condenser 31 tuned to the line frequency. The tuned circuit is, however, dimensioned only for the low maximum value of the secondary current, and the voltage of the measuring circuit is kept such that the transformers operate on the straight portion of their curves throughout the entire measuring range. The current to be measured passes through the coils of a plurality of contactors 23, 24 and 25 for the purpose of adjusting the inductance of coil 17 to the proper value. The system also includes a meter to compare the values of the currents in the generator circuit and in coil 26 alone, which meter comprises coils 51 and 52 receiving respectively the curernts to be compared, and a vane carrying a pointer, the position of which will be responsive to the relative values of the currents in coils 51 and 52. The connections to said coils may be effected through transformers 53 and 33 to the grounded line and to the ammeter circuit respectively.

Assuming that only the section of line 3 between windings 6 and circuit breaker 11 is operative and that generator 38 is operating, reference to the simplified diagram of Figure 2 will show that, for the purpose of measurement, the generator circuit comprises inductance 37, and two parallel circuits including coil 26 and coil 17 in series with condensers 7 only. If the auxiliary frequency is so high that the series formed by coil 17 and the capacities has substantially a capacitive characteristic, the grounding circuit is formed by the capacities and the inductance of coil 26 in parallel. The inductance 37 of the measuring circuit is connected in series with the above parallel circuits. Because coil 26 has a much smaller inductance than coil 17, the latter and the condenser 7 will be close to the resonance condition for the line frequency, and will therefore be far removed from resonance for the generator frequency which is a multiple thereof. The generator is therefore not apt to introduce oscillations into the line and the ground coils, as would be the case if such coils were in resonance with the generator frequency. The magnitude of the generator current, measured by ammeter 32, is determined by the values of inductance 37, coils 17 and 26, and line capacity 7. Thus, if the line section between the circuit breakers 11 and 12 is connected to the section from winding 6 to circuit breaker 11, capacity 8 will be added and the reading of ammeter 32 will vary accordingly. Such reading will again vary slightly when coil 17 is adjusted to the new value of the line capacity. It, therefore, appears that the readings of ammeter 32 can be calibrated to represent line capacities.

The value of inductance 37 being arbitrary, it is convenient to make the value such that, when the length of the transmission line is a maximum, the combined circuit comprising inductance 37, coil 26 and coil 17 with line capacity 7 is in resonance for the generator frequency. Such resonance insures a large current for a low generator voltage; and any change in the line capacity will throw the circuit out of resonance, so that a slight variation of line capacity will cause a large variation of the generator current, thereby making the device highly sensitive. As set forth above, the generator current and the current in coil 37 are compared by meter 51, 52. Such comparison gives a direct measurement of the relative values of inductance of coil 17 and of the line capacity 7 and, therefore, of the closeness of the tuning of the two quantities. The invention thus permits the length of the line to be determined by measurement of the current of the auxiliary frequency and the quenching coil is automatically adjusted to resonance values corresponding to such line length by relays or contactors operated by current of the auxiliary frequency.

As appears from Figure 1 the measuring circuits are insulated by means of transformer 36 which does not change the current relations thereof. Transformer 36, however, also permits any ground currents circulating in coil 26 to flow in generator 38 and inductance 37. Such ground currents are transmitted over current transformers 41 and 42 and the resonant branch of bypass 30, 31. When one of the line conductors becomes grounded, the ground current in coil 26, transformer 36 and transformer 41, 42 become very large. The cores of transformers 41, 42 then become saturated, so that the line frequency current transmitted by said transformers to bypass 30, 31 is limited to a safe value. Ammeter 32 thus never receives current at line frequency.

With the connections as shown in Figure 1, the generator current will be a minimum, and contactors 23, 24, 25 do not operate. The entire coil 17 is then in circuit. If it is assumed that the line section beyond circuit breaker 11 is added to the line section from windings 6 to circuit breaker 11, the generator current will increase, and contactor 23 will operate, disconnecting part of coil 17 so as to reestablish the proper relation between the inductance of coils 17 and 26 and the capacity of the line. When further sections are added to the line, the generator current will receive further increases, causing contactors 24 and 25 to operate in succession. The reverse of the above operations occurs upon disconnection of the various line sections.

Although but one embodiment of the present invention has been illustrated and described, it will be apparent to those skilled in the art that various changes and modifications may be made therein without departing from the spirit of the invention or from the scope of the appended claims.

The invention claimed is:

1. In an electrical protective system, an alternating current transmission line, electrical apparatus connected with said line and having a neutral point, a plurality of reactance coils connected between the neutral point of said apparatus and ground, one of said coils being adjustable, and means for adjusting one of said coils to obtain substantially resonance of said coils with the capacity of said line to ground.

2. In an electrical protective system, an alternating current transmission line, electrical apparatus connected with said line and having a neutral point, a plurality of reactance coils connected between the neutral point of said apparatus and ground, one of said coils being adjustable, and means variably operable in dependence upon the capacity of said line to ground for automatically tuning said adjustable coil to obtain substantially resonance of said coils with the capacity of said line to ground.

3. In an electrical protective system, an alternating current transmission line, electrical apparatus connected with said line and having a neutral point, a plurality of reactance coils connected between the neutral point of said apparatus and ground, one of said coils being adjustable, means operable responsive to and in dependence upon changes in capacitance of said line to ground for automatically tuning said adjustable coil to obtain substantially resonance of said coils with the capacity of said line to ground, and means for ascertaining the capacity of said line to ground.

4. In an electrical protective system, an alternating current transmission line, electrical apparatus connected with said line and having a neutral point, a plurality of reactance coils connected between the neutral point of said apparatus and ground, one of said coils being adjustable, a source of alternating current at a frequency other than the frequency of said line connected with one of said coils, and means operable by said source of alternating current to tune said adjustable coil to obtain substantially resonance of said coils with the capacity of said line to ground.

5. In an electrical protective system, an alternating current transmission line, electrical apparatus connected with said line and having a neutral point, a plurality of reactance coils connected between the neutral point of said apparatus and ground, one of said coils being adjustable, a source of alternating current at a frequency other than the frequency of said line connected with one of said coils, and relays connected with said source of alternating current to vary the adjustment of said adjustable coil, said relays being operable by said source of alternating current to tune said coils to substantially resonance with the capacity of said line to ground.

6. In an electrical protective system, an alternating current transmission line, electrical apparatus connected with said line and having a neutral point, a plurality of reactance coils connected between the neutral point of said apparatus and ground, one of said coils being adjustable, a source of alternating current at a frequency other than the frequency of said line connected with one of said coils, means operable by said source of alternating current to tune said coils to substantially resonance with the capacity of said line to ground, and means connected with said source of alternating current and with said coils to ascertain the relations between said line and said source of alternating current.

7. In an electrical protective system, an alternating current transmission line, electrical apparatus connected with said line and having a neutral point, a tapped reactance coil connected with the neutral point of said apparatus, a non-variable reactance coil connected with said tapped coil and ground, an auxiliary circuit connected with said non-variable coil, a source of alternating current of a frequency other than the frequency of said line forming a portion of said circuit, and means connected between said non-variable coil and ground and with said auxiliary circuit to ascertain the active length of said line.

8. In an electrical protective system, an alternating current transmission line, electrical apparatus connected with said line and having a neutral point, a tapped reactance coil connected with the neutral point of said apparatus, a non-variable reactance coil connected with said tapped coil and ground, an auxiliary circuit connected with said non-variable coil, a source of alternating current of a frequency other than the frequency of said line forming a portion of said circuit, an inductance coil forming a portion of said circuit, the inductance of said coil being such as to tune said auxiliary circuit substantially to resonance with the frequency of said line, and means connected between said non-variable coil and ground and with said auxiliary circuit to ascertain the active length of said line.

9. In an electrical protective system, an alternating current transmission line, electrical apparatus connected with said line and having a neutral point, a plurality of reactance coils connected between the neutral point of said apparatus and ground, one of said coils being adjustable, said coils being connected in series, and means for adjusting said adjustable coil to secure substantially resonance of said coils with the capacity of said line to ground.

10. In an electrical protective system, a high voltage alternating current transmission line, electrical apparatus connected with said line and having a neutral point, a plurality of reactance coils connected in series with the neutral point of said apparatus and with ground, an auxiliary circuit connected in parallel with one of said coils, a source of alternating current forming a portion of said circuit, and an ammeter forming a portion of said circuit to indicate the active length of said line.

11. In an electrical protective system, a high voltage alternating current transmission line, electrical apparatus connected with said line and having a neutral point, a plurality of reactance coils connected in series with the neutral point of said apparatus and with ground, an auxiliary circuit, a transformer connecting said circuit in parallel with one of said coils, a source of alternating current of a frequency other than the frequency of said transmission line forming a portion of said circuit, and an ammeter forming a portion of said circuit to indicate the current flowing therein.

12. In an electrical protective system, a high voltage alternating current transmission line, electrical apparatus connected with said line and having a neutral point, a plurality of reactance coils connected in series with the neutral point of said apparatus and with ground, an auxiliary circuit, a transformer connecting said circuit in parallel with one of said coils, a source of alternating current forming a portion of said circuit, a measuring circuit, an ammeter in said measuring circuit, transformers connecting said measuring circuit with said auxiliary circuit, the secondary wndings of said transformers being arranged in opposition to each other.

13. In an electrical protective system, a high voltage alternating current transmission line, electrical apparatus connected with said line and having a neutral point, a plurality of reactance coils connected in series with the neutral point of said apparatus and with ground, an auxiliary circuit connected in parallel with one of said coils, said circuit comprising a source of alternating current, an inductance, and one of the windings of a plurality of transformers, an ammeter connected with the other winding of some of said transformers, and a circuit tuned to the frequency of said line connected across the secondary windings of said transformer.

14. In an electrical protective system, an alternating current transmission line, electrical apparatus connected with said line and having a neutral point, a plurality of reactance coils connected between the neutral point of said apparatus and ground, one of said coils being adjustable, means for varying the adjustment of said coil, a transformer connected in parallel with the non-variable reactance coil, an auxiliary circuit connected with said transformer and including a source of alternating current of a frequency other than the frequency of said line, an inductance, and the primary windings of a plurality of transformers, said transformers supplying current to said means for controlling the adjustment of said adjustable coil, a second auxiliary circuit connected between said reactance coils and ground and connected with said first auxiliary circuit, and means arranged within said second auxiliary circuit to ascertain the degree of tuning of said adjustable coil relative to the capacity of said line to ground.

JULIUS JONAS.